Jan. 18, 1927. 1,615,070

J. W. BUNKER

ILLUMINATING DEVICE

Filed Oct. 26, 1925

Inventor:
John W. Bunker
By his Attorney
Edmond Conger Brown

Patented Jan. 18, 1927.

1,615,070

UNITED STATES PATENT OFFICE.

JOHN W. BUNKER, OF NEW YORK, N. Y.

ILLUMINATING DEVICE.

Application filed October 26, 1925. Serial No. 64,925.

My invention relates to illuminating devices, and more particularly to such devices adapted for use in connection with an automobile or other vehicle, and one of its principal objects is to provide a form of such device which, while sufficiently illuminating the roadway in front of the vehicle, shall not produce the objectionable glare which is an accompaniment of forms of automobile lights now in use, caused by the projection forward of an intense beam of light, which, as is well known, is a source of frequent accidents upon public highways by reason of the temporary blinding of pedestrians and operators of other vehicles so that it is impossible for them to distinguish the exact location of the oncoming vehicle bearing the light. In my invention, the construction, arrangement and combination of the parts is such that the forward part of the vehicle bearing the light is strongly illuminated, so that a pedestrian or an operator of an approaching vehicle perceives, not so much the glare of the light itself, as he does the reflection of such light from the body of the vehicle, thus more nearly simulating daylight conditions where the vehicle itself can be so easily distinguished as to make it quite possible to avoid contact with the same. Another object of the invention is to provide means by which a beam of light can be directed toward either side or upwards when desired for the purpose of distinguishing landmarks, reading the numbers or signs upon buildings and the like, for the purpose of identifying the same.

The invention consists in the novel construction, arrangement and combination of various devices, elements and parts, as set forth in the claims hereof, one embodiment of the same being illustrated in the accompanying drawings and described in this specification.

In the accompanying drawings—

Figure 1:
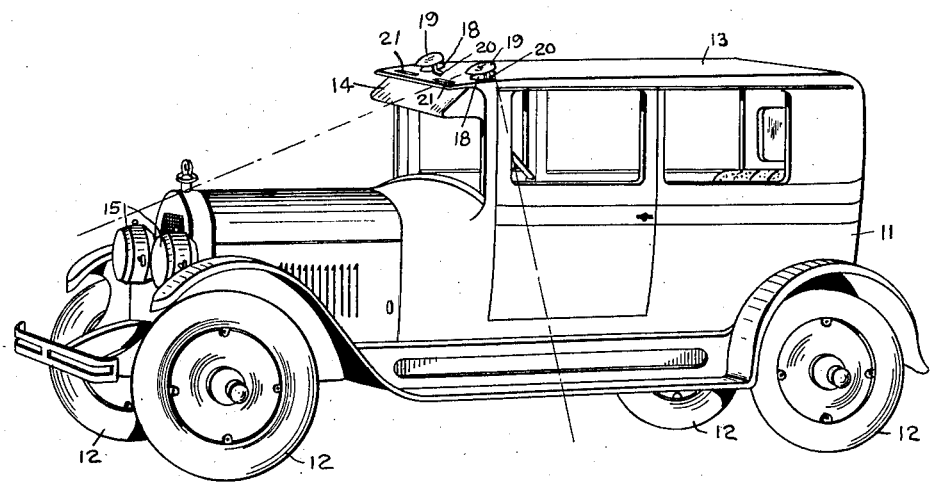
Fig. 1 is a perspective view of an automobile provided with lights constructed according to my invention.

Referring to Fig. 1 of the drawings, 11 represents the body of an automobile having running gear 12, a roof 13, a forwardly projecting shed 14, and other usual parts. The vehicle may be provided with ordinary headlights 15, so that they may be used, in addition to my improved lighting device, where local ordinances or custom require the use of such a form of light, but ordinarily such headlights will be unnecessary in connection with my improved lighting device.

Figure 4:
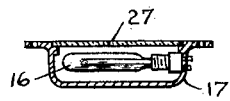
Fig. 4 is a sectional view of a portion of Fig. 2.

In carrying my invention into effect in the embodiment thereof which I have selected for description in this specification and illustration in the accompanying drawings, I provide electric lamps 16 or other suitable sources of illumination, suitably mounted on the under side of the roof of the car near the forward corners (see Fig. 4). The said lamps are connected with wires leading to a storage battery or other source of current, not shown in the drawings. Underneath each of said lamps I place a bowl or shade of the usual or any suitable type, designated 17.

Figure 2:
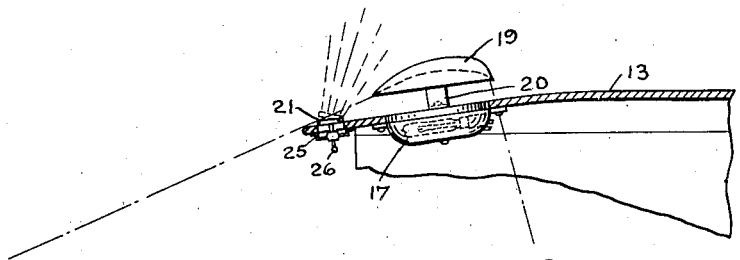
Fig. 2 is a sectional view of a portion of an automobile showing my invention in position.

Openings 18 are provided in the roof of the car over said lamps, in which are inserted plates of glass 27, and over each opening is a reflector 19, supported by a bracket 20, this part of the construction being best shown in Fig. 2. The reflector is not necessarily in the usual parabolic form adapted to throw a substantially parallel beam of light forward of the car, but should be of some suitable form and curvature adapted to send the light downwards and partly forwards so as to light up portions of the front of the car and also the portion of the roadway forward of the car, and I prefer to make the reflectors of a somewhat asymetrical curvature, so that the rear part of the reflection therefrom shall be directed more nearly vertical than the forward part of the reflected beam, which I have indicated in a general way in Figs. 1 and 2 of the accompanying drawings. The reflectors 19 are shown in Fig. 2 as rigidly attached to the roof 13, but they may of course be adjustably secured thereto if desired, so as to permit the reflected light to be sent in various directions.

Figure 3:
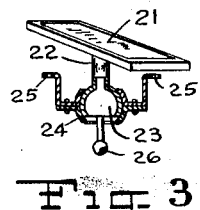
Fig. 3 is a detail view hereinafter more particularly described.

In front of the lights and near the forward edge of the roof 13, at each corner thereof, I provide a small auxiliary reflector 21, one of these reflectors and the mounting for the same being shown in detail in Fig. 3. By reference to said figure it will be seen that the reflector 21 is mounted upon a stem 22 which is enlarged at its lower end into a ball 23. This ball is mounted in a socket 24, the attaching legs 25 of which are secured to the under side of the roof. A handle or directing lever 26 is provided, by the manipulation of which the reflector 21 may be so positioned as to direct a ray from one of the lamps 16 in any direction desired, serving for instance as a spotlight to read the number of a building at the side of the street, a sign on the road, or the like.

The advantages of my invention will be obvious from what has been above said with regard to the construction and functioning of the same.

I do not limit myself to the exact form of construction which has been here shown and described, the same being merely one embodiment of the said invention. It is obvious that various changes in detail and method of construction can be made without departing from the spirit and scope of my invention.

Having thus described my invention, what I claim as new and desire to secure by Letters Patent is as follows:

1. The combination with a vehicle having a roof and having an opening in said roof near the front edge thereof and a transparent closure in said opening; of a lamp located below said opening, a bowl below said lamp and a reflector located above said opening, adapted to reflect the light from said lamp downward upon the forward portion of the vehicle and slantingly sideways and forward upon the ground at the side and front of the vehicle.

2. The combination with a vehicle having a roof and having an opening in said roof near the front edge and a transparent closure in said opening; of a lamp located adjacent said opening and a reflector located above said opening adapted to reflect the light from said lamp downward upon the forward portion of the vehicle and slantingly sideways and forward upon the ground at the side and front of the vehicle.

In witness whereof I have hereunto signed my name this 20th day of October 1925.

JOHN W. BUNKER.